US008966648B2

(12) United States Patent
Aggarwal et al.

(10) Patent No.: US 8,966,648 B2
(45) Date of Patent: Feb. 24, 2015

(54) METHOD AND APPARATUS FOR VARIABLE PRIVACY PRESERVATION IN DATA MINING (71) Applicant: International Business Machines Corporation, Armonk, NY (US)

(72) Inventors: Charu C. Aggarwal, Mohegan Lake, NY (US); Philip Shi-Lung Yu, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/051,530

(22) Filed: Oct. 11, 2013

(65) Prior Publication Data
US 2014/0041049 A1 Feb. 6, 2014

Related U.S. Application Data (63) Continuation of application No. 12/119,766, filed on May 13, 2008, now Pat. No. 8,627,070, which is a continuation of application No. 11/249,647, filed on Oct. 13, 2005, now abandoned.

(51) Int. Cl.
H04L 29/06 (2006.01)
G06F 21/60 (2013.01)
G06F 21/62 (2013.01)

(52) U.S. Cl.
CPC .......... G06F 21/604 (2013.01); G06F 21/6245 (2013.01); G06F 21/6254 (2013.01)
USPC ............. 726/26; 713/165; 713/166; 707/781; 707/783

(58) Field of Classification Search
None
See application file for complete search history.

(56) References Cited

U.S. PATENT DOCUMENTS

| 6,633,872 | B2 * | 10/2003 | Ambrosini et al. ................ 1/1 |
| 7,024,409 | B2 | 4/2006 | Iyengar |
| 2003/0208457 | A1 | 11/2003 | Iyengar |
| 2004/0199781 | A1 | 10/2004 | Erickson et al. |

FOREIGN PATENT DOCUMENTS

WO PCT/EP2006/066858 1/2007
WO 2007042403 A1 4/2007

OTHER PUBLICATIONS

Sven Crone, Stefan Lessmann, Robert Stahlbock, "Utility based Data Mining for Time Series Analysis—Cost-Sensitive Learning for Neural Network Predictors," UBDM '05, Aug. 21, 2005, pp. 59-68.*

(Continued)

Primary Examiner — Kaveh Abrishamkar
(74) Attorney, Agent, or Firm — Jeff Teng; Ryan, Mason & Lewis, LLP (57) ABSTRACT Improved privacy preservation techniques are disclosed for use in accordance with data mining. By way of example, a technique for preserving privacy of data records for use in a data mining application comprises the following steps/operations. Different privacy levels are assigned to the data records. Condensed groups are constructed from the data records based on the privacy levels, wherein summary statistics are maintained for each condensed group. Pseudo-data is generated from the summary statistics, wherein the pseudo-data is available for use in the data mining application. Principles of the invention are capable of handling both static and dynamic data sets 20 Claims, 6 Drawing Sheets

(56) References Cited

OTHER PUBLICATIONS

C.C. Aggarwal et al., "A Condensation Approach to Privacy Preserving Data Mining," Proceedings of the EDBT Conference, 18 pages, 2004.

C.C. Aggarwal et al., "Mining Massively Incomplete Data Sets by Conceptual Reconstruction," Proceedings of the ACM KDD Conference, 6 pages, 2001.

D. Agrawal et al., "On the Design and Quantification of Privacy Preserving Data Mining Algorithms," Proceedings of the ACM PODS Conference, 9 pages, 2002.

R. Agrawal et al., "Privacy-Preserving Data Mining," Proceedings of the ACM SIGMOD Conference, 12 pages, 2000.

C. Clifton et al., "Security and Privacy Implications of Data Mining," Proceedings of the 1996 ACM SIGMOD Workshop on Data Mining and Knowledge Discovery, 5 pages, 1996.

J. Vaidya et al., "Privacy Preserving Association Rule Mining in Vertically Partitioned Data," ACM SIGKDD Conference, 6 pages, 2002.

L.F. Cranor, "Internet Privacy," Communications of the ACM, vol. 42, No. 2, pp. 29-31,Feb. 1999.

The Economist, "The End of Privacy," www.economist.com, 2 pages, Apr. 1999.

V.Estivill-Castro et al., "Data Swapping: Balancing Privacy Against Precision in Mining for Logic Rules," Data Warehousing and Knowledge Discovery, Springer-Verlag, 10 pages, 1999.

A. Evfimievski et al., "Privacy Preserving Mining of Association Rules," ACM KDD Conference, 12 pages, 2002.

A. Hinneburg et al., "An Efficient Approach to Clustering in Large Multimedia Databases with Noise," ACM KDD Conference, 8 pages, 1998.

V.S. Iyengar, "Transforming Data to Satisfy Privacy Constraints," ACM KDD Conference, 10 pages, 2002.

C.K. Liew et al., "A Data Distortion by Probability Distribution," ACM Transactions on Database Systems, vol. 10, No. 3, pp. 395-411, Sep. 1985.

T. Lau et al., "Privacy Interfaces for Information Management," Communications of the ACM, vol. 42, No. 10, 8 pages, 1999.

P. Samarati et al., "Protecting Privacy when Disclosing Information: k-Anonymity and Its Enforcement through Generalization and Suppression," Proceedings of the IEEE Symposium on Research in Security and Privacy,pp. 1-19, 1998.

S.L. Warner, "Randomized Response: A Survey Technique for Eliminating Evasive Answer Bias," Journal of the American Statistical Association, vol. 60, No. 309, pp. 63-69, 1965.

R. Caruana et al., "Data Mining in Metric Space:Performance Criteria," KDD '04, Aug. 22-25, 2004, pp. 69-78.

\* cited by examiner

METHOD AND APPARATUS FOR VARIABLE PRIVACY PRESERVATION IN DATA MINING

CROSS-REFERENCE TO RELATED APPLICATION(S)

This application is a Continuation of U.S. application Ser. No. 12/119,766, filed on May 13, 2008, now U.S. Pat. No. 8,627,070, which is a Continuation of U.S. application Ser. No. 11/249,647 filed on Oct. 13, 2005, now abandoned, the disclosures of which are incorporated herein by reference.

STATEMENT OF GOVERNMENT RIGHTS

This invention was made with Government support under Contract No.: H98230-04-3-0001 awarded by the U.S. Department of Defense. The Government has certain rights in this invention.

FIELD OF THE INVENTION

The present invention relates to data mining techniques and, more particularly, to variable privacy preserving, data mining techniques.

BACKGROUND OF THE INVENTION

Privacy preserving data mining has become an important issue in recent years due to the large amount of consumer data tracked by automated systems on the Internet. The proliferation of electronic commerce on the World Wide Web has resulted in the storage of large amounts of transactional and personal information about users. In addition, advances in hardware technology have also made it more feasible to track information about individuals from transactions in everyday life.

For example, a simple transaction such as using a credit card results in automated storage of information about user buying behavior. In many cases, users are not willing to supply such personal data unless its privacy is guaranteed. Therefore, in order to ensure effective data collection, it is important to design methods which can mine the data with a guarantee of privacy.

However, while there has been a considerable amount of focus on privacy preserving data collection and mining methods in recent years, such methods assume homogeneity in the privacy level of different entities.

Accordingly, it would be highly desirable to provide improved techniques for use in accordance with a privacy preserving data mining.

SUMMARY OF THE INVENTION

Principles of the invention provide improved privacy preservation techniques for use in accordance with data mining.

By way of example, one aspect of the invention comprises a technique for preserving privacy of data records for use in a data mining application comprising the following steps/operations. Different privacy levels are assigned to the data records. Condensed groups are constructed from the data records based on the privacy levels, wherein summary statistics are maintained for each condensed group. Pseudo-data is generated from the summary statistics, wherein the pseudo-data is available for use in the data mining application.

Advantageously, principles of the invention provide a new framework for privacy preserving data mining, in which the privacy of all records is not the same, but can vary considerably. This is often the case in many real applications, in which different groups of individuals may have different privacy requirements. Further, principles of the invention are capable of handling both static and dynamic data sets.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system architecture in which it would be desirable to provide variable privacy preservation in accordance with data mining techniques.

As used herein, the phrase "data stream" may generally refer to a continuous sequence of data over a given time period. By way of example, such a sequence of data may be generated by a real-time process which uses continuous data storage. However, it is to be understood that principles of the invention are not limited to any particular type of data set or type of data stream.

Further, the phrase "data point" (or point) is used herein interchangeably with the phrase "data record" (or record). By way of example only, in a demographic data set, a data point or record could refer to one or more attributes of an individual. For example, it could refer to a record containing age, sex, and/or salary, etc. On the other hand, the term "group" refers to a set of records which are similar. The similarity may be defined by a distance function. Thus, a group could be a set of individuals with similar demographic characteristics. However, the invention is not limited to these particular types of data points, data records, or groups.

A recent approach to privacy preserving data mining has been a condensation-based technique, as disclosed in C. C. Aggarwal and P. S. Yu, "A Condensation Based Approach to Privacy Preserving Data Mining," Proceedings of the EDBT Conference, pp. 183-199, 2004. This technique essentially creates condensed groups of records which are then utilized in one of two ways. First, the statistical information in the pseudo-groups can be utilized to generate a new set of pseudo-data which can be utilized with a data mining algorithms. Second, the condensed pseudo-groups can be utilized directly with minor modifications of existing data mining algorithms.

The condensation approach of is also referred to as the k-indistinguishability model. A record is said to be k-indistinguishable, when there are at least k other records in the data (including itself) from which it cannot be distinguished. Clearly, when a record is 1-indistinguishable, it has no privacy. The k-indistinguishability of a record is achieved by placing it in a group with at least (k-1) other records. The condensation-based approach does not rely on domain specific hierarchies, and the k-indistinguishability model can also work effectively in a dynamic environment such as that created by data streams.

However, in the k-indistinguishability model approach, it is assumed that all records have the same privacy requirement. In most practical applications, this is not always a reasonable assumption. For example, when a data repository contains records from heterogeneous data sources, it is rarely the case that each repository has the same privacy requirement. Similarly, in an application tracking the data for brokerage customers, the privacy requirements of retail investors are likely to be different from those of institutional investors. Even among a particular class of customers, some customers (such as high net-worth individuals) may desire a higher level of privacy than others.

In general, principles of the invention realize that it may be desirable to associate a different privacy level with each record in a data set. Thus, an illustrative embodiment of the invention, to be described herein, provides for variable privacy levels in a condensation-based privacy preserving, data mining methodology.

Let us assume that we have a database D containing N records. The records are denoted by $X_1 \ldots X_N$. We denote this desired privacy level for record $X_i$ by p(i). The process of finding condensed groups with a varying level of point-specific privacy makes the problem significantly more difficult from a practical standpoint. This is because it may not be advisable to pre-segment the data into different privacy levels before performing the condensation separately for each segment. When some of the segments contain very few records, such a condensation may result in an inefficient representation of the data. In some cases, the number of records for a given level of privacy k' may be lower than k'. Clearly, it is not even possible to create a group containing only records with privacy level k', since the privacy level of the entire group would then be less than k'. Therefore, it is not possible to create an efficient (and feasible) system of group condensation without mixing records of different privacy levels. This leads to a number of interesting trade-offs between information loss and privacy preservation. Principles of the invention provide algorithms that optimize such trade-offs.

In many cases, the data may be available at one time or it may be available in a more dynamic and incremental fashion. Thus, principles of the invention provide a methodology for performing the condensation when the entire data is available at one time, and a methodology for the case when the data is available incrementally. The latter is a more difficult case because it is often not possible to design the most effective condensation at the moment the data becomes available. It will be evident that, in most cases, the algorithm for performing the dynamic group construction is able to achieve results which are comparable to the algorithm for static group construction.

Before describing details of a condensation-based data mining algorithm for providing variable privacy preservation, we will discuss some notations and definitions. We assume that we have a set of N records, each of which contains d dimensions. We also assume that associated with each data point i, we have a corresponding privacy level p(i). The overall database is denoted by D whereas the database corresponding to the privacy level p is denoted by $D_p$.

The privacy level for a given record is defined as the minimum number of other records in the data from which it can not be distinguished.

In the condensation-based approach, the data is partitioned into groups of records. Records within a given group can not be distinguished from one another. For each group, certain summary statistics about the records are maintained. These summary statistics provide the ability to apply data mining algorithms directly to the condensed groups of records. This information also suffices to preserve information about the mean and correlations across the different dimensions of the data. The size of the groups may vary, but its size is at least equal to the desired privacy level of each record in that group. Thus, a record with privacy level equal to p(i) may be condensed with records of privacy levels different from p(i). However, the size of that group is at least equal to the maximum privacy level of any record in that group.

Each group of records is referred to as a condensed unit. Let G be a condensed group containing the records $X_1 \ldots X_k$. Let us also assume that each record $X_i$ contains the d dimensions which are denoted by $x_i^1 \ldots x_i^d$. The following information is maintained about each group of records G:

(i) For each attribute j, the sum of corresponding values is maintained. The corresponding value is given by $\sum_{r=1}^{k} x_r^j$. We denote the corresponding first-order sums by $Fs_j(G)$. The vector of first order sums is denoted by $Fs(G)$.

(ii) For each pair of attributes i and j, the sum of the product of corresponding attribute values is maintained. The corresponding sum is given by $\sum_{r=1}^{k} x_r^i \cdot x_r^j$. We denote the corresponding second order sums by $Sc_{ij}(G)$. The vector of second order sums is denoted by $Sc(G)$.

(iii) The sum of the privacy levels of the records in the group is maintained. This number of denoted by $Ps(G)$.

(iv) The total number of records k in that group is maintained. This number is denoted by $n(G)$.

We note that these summary statistics can be used to construct a covariance matrix for that group, which is also maintained as part of the summary statistics. The covariance matrix is simply a d*d matrix where the ijth entry refers to covariance between dimensions i and j. The covariance matrix is used in turn to create the pseudo-records for the group. As will be further explained below, in one embodiment, the pseudo-records (pseudo-data) are generated independently along each eigenvector. That is, records are generated with variance proportional to the corresponding eigenvalue along each eigenvector.

We note that the algorithm for group construction tries to put each record in a group which is at least equal to the maximum privacy level of any record in the group. A natural solution is to first classify the records based on their privacy levels and then independently create the groups for varying privacy levels. Unfortunately, this does not lead to the most efficient method for packing the sets of records into different groups. This is because the most effective method for constructing the groups may require us to combine records from different privacy levels. For example, a record with a very low privacy requirement may sometimes naturally be combined with a group of high privacy records in its locality. An attempt to construct a separate group of records with a low privacy requirement may lead to an even higher loss of information.

First, we need a measure to quantify the effectiveness of a given condensation-based approach. In general, this effectiveness is related to the level of compactness with which we can partition the data into different groups. However, there are several constraints on the cardinality of the data points in each group as well as the identity of the data points which can be added to a group with given cardinality. Thus, for the process of quantification of the condensation quality, in one embodiment, we use the square sum error of the data points in each group. While the privacy level of a group is determined by the number of records in it, the information loss is defined by the average variance of the records about their centroid. We will refer to this quantity as the Sum Squared Error (SSQ).

The method of group construction is different depending upon whether an entire database of records is available or whether the data records arrive in an incremental fashion. We will discuss two approaches for construction of class statistics. The first approach is utilized for the case when the entire database of records is available. The second approach is utilized in an incremental scheme in which the data points arrive one at a time. First, we will discuss the static case in which the entire database of records is available.

The essence of the static approach is to construct the groups using an iterative method in which the groups are processed with increasing privacy level. We assume that the segment of the database with a privacy level requirement of p is denoted by $D_p$. We also assume that the set of groups with a privacy level of p is denoted by $H_p$. We note that the database $D_1$ consists of the set of points which have no privacy constraint at all. Therefore, the group $H_1$ is comprised of the singleton items from the database $D_1$.

Next, the statistics of the groups in $H_p$ are constructed using an iterative algorithm. In each iteration, the privacy level p is increased by one, and the condensed groups $H_p$ which have privacy level p are constructed. The first step is to construct the group $H_p$ by using a purely segmentation based process. This segmentation process is a straightforward iterative approach. In each iteration, a record X is sampled from the database $H_p$. The closest (p-1) records to this individual record X are added to this group. Let us denote this group by G. The statistics of the p records in G are computed. Next, the p records in G are removed from $D_p$. The process is repeated iteratively, until the database $D_p$ is empty. We note that at the end of the process, it is possible that between 1 and (p-1) records may remain. These records can be added to their nearest sub-group in the data. Thus, a small number of groups in the data may contain larger than p data points. During the iterative process, it is possible that points from a group with lower privacy level may fit better with groups of a higher privacy level. Such groups can be cannibalized to higher level groups. The reverse is true in some cases where some of the points can be fit to lower level groups, when the group has larger than the desired number of points for that particular privacy level.

This procedure can also be extended to the dynamic case. The process of dynamic maintenance of groups is useful in a variety of settings such as that of data streams. In the process of dynamic maintenance, the points in the data stream are processed incrementally.

The incremental algorithm works by using a nearest neighbor approach. When an incoming data point $X_i$ is received, the closest cluster to the data point is found using the distance of the data point $X_i$ to the different centroids. While it is desirable to add $X_i$ to its closest centroid, $X_i$ can not be added to a given cluster which has fewer than p(i)-1 data points in it. Therefore, the data point $X_i$ is added to the closest cluster which also happens to have at least p(i)-1 data points inside it. In general, it is not desirable to have groups with high sizes compared to their constituent privacy levels. When such a situation arises, it effectively means that a higher level of representational inaccuracy is created than is really necessary with the privacy requirements of the points within the group. The average privacy level of the group G can be computed from the condensed statistics. This number is equal to $Ps(G)/n(G)$. This is because $Ps(G)$ is equal to the sum of the privacy levels of the data points in the group.

The split criterion used by an illustrative algorithm of the invention is that a group is divided when the number of items in the group is more than twice the average privacy level of the items in the group. Therefore, the group is split when the following holds true:

$$n(G) \geq 2\, Ps(G)/n(G)$$

We utilize a uniformity assumption in order to split the group statistics. In each case, the group is split along the eigenvector with the largest eigenvalue. This also corresponds to the direction with the greatest level of variance. This is done in order to reduce the overall variance of the resulting clusters and ensure the greatest compactness of representation. We assume without loss of generality that the eigenvector $e_1$ with the lowest index is the chosen direction the split.

Once the groups have been generated, we can also generate the pseudo-data from the different condensed groups. The pseudo-data from the condensed groups are generated using a data generation approach described herein below.

Figure 1:
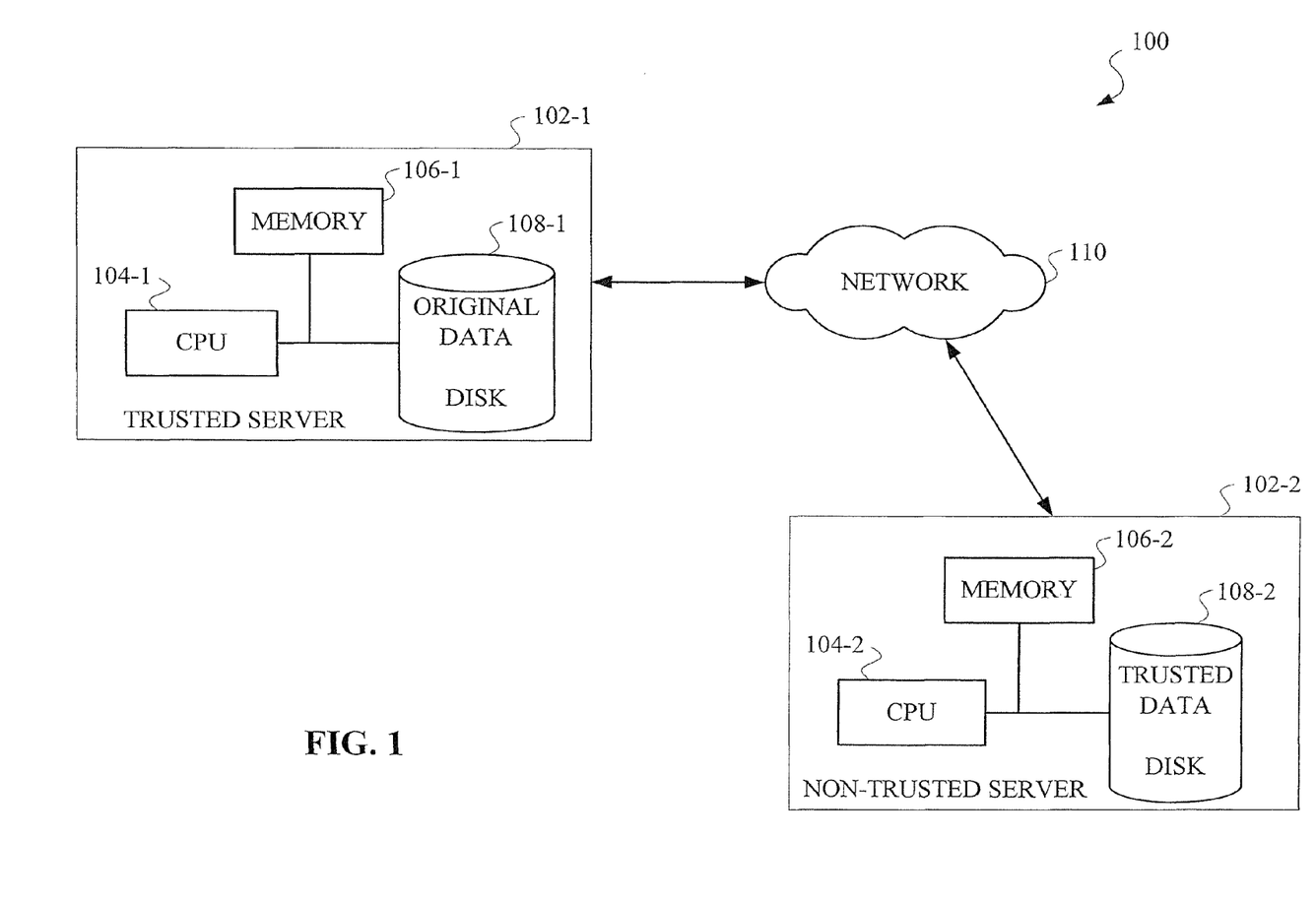
FIG. 1 illustrates a server architecture and network environment in accordance with which variable privacy preserving, data mining techniques may be employed, according to an embodiment of the present invention.

Referring initially, FIG. 1 is a block diagram illustrating a server architecture and network environment in accordance with which variable privacy preserving, data mining techniques may be employed, according to an embodiment of the present invention.

As illustrated, an exemplary network environment 100 comprises a trusted server 102-1 and a non-trusted server 102-2. Each server (102-1, 102-2) may comprise a central processing unit or CPU (104-1, 104-2) coupled to a volatile main memory (106-1, 106-2) and a non-volatile disk (108-1, 108-2). The servers are connected over a communication network 110. It is to be appreciated that the network may be a public information network such as, for example, the Internet or World Wide Web, however, the servers may alternatively be connected via a private network, a local area network, or some other suitable network.

It is to be understood that a server may receive data to be processed from any source or sources. For example, one or more client devices (not shown) may supply data to be processed to a server. However, all or portions of the data to be processed may already be available at the server (e.g., on disk), or may be accessible by the server. The main memory may be used in order to store some or all of the intermediate results performed during the operations/computations.

Further, software components including instructions or code for performing the methodologies of the invention, as described herein, may be stored in one or more memory devices described above with respect to the server and, when ready to be utilized, loaded in part or in whole and executed by the CPU.

In one preferred embodiment, the variable privacy preservation operations of the invention (i.e., condensation operations) are performed at trusted server 102-1. That is, CPU 104-1 of the trusted server is used in order to perform the privacy preservation operations on the original data. As mentioned above, the original data may be received from any source or sources (e.g., one or more client devices connected to the server over the network) and stored in disk 108-1. Once processed in accordance with the privacy preservation operations at the trusted server 102-1, the data (which is now considered "trusted data" after being processed) may be sent to non-trusted server 102-2 where it is stored on disk 108-2. In accordance with CPU 104-2 and 106-2, data mining may be performed on the trusted data at the non-trusted server.

Figure 2:
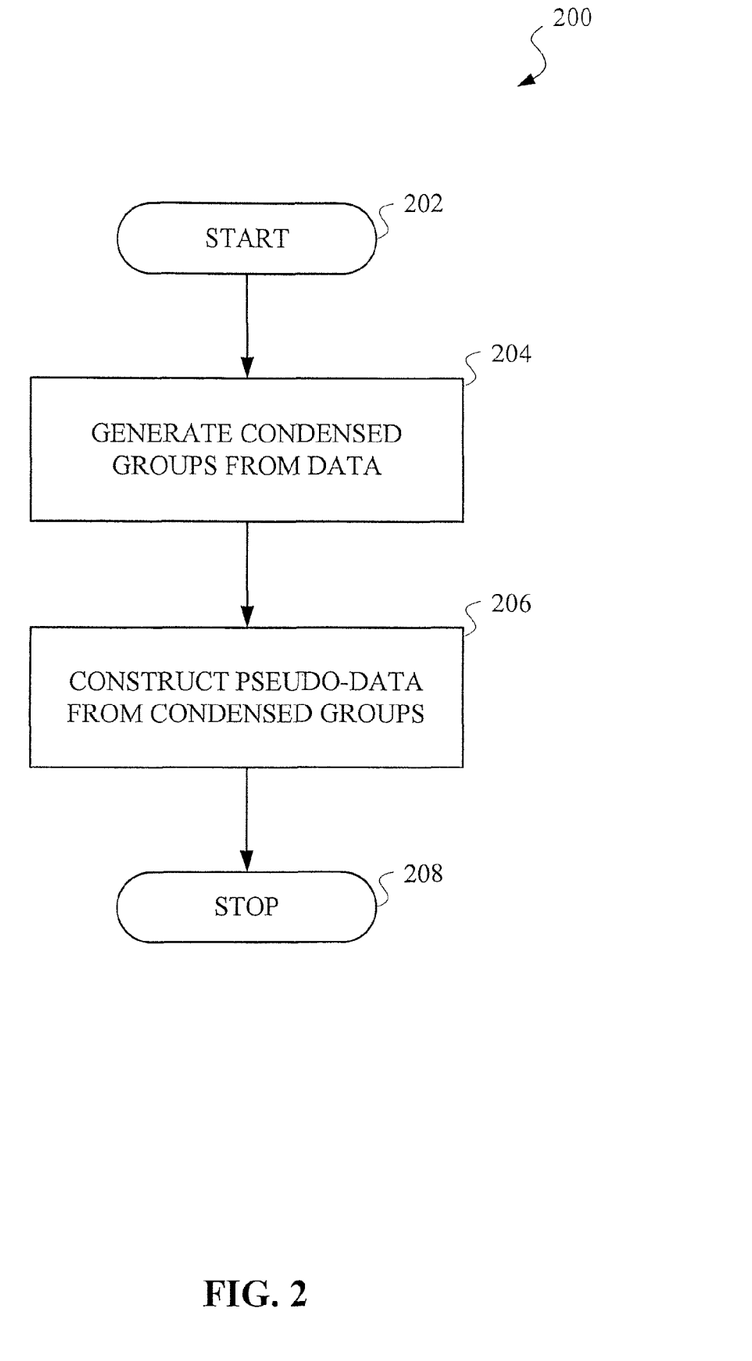
FIG. 2 illustrates a process for performing variable privacy preservation, according to an embodiment of the present invention.

Referring now to FIG. 2, a flow diagram illustrates a process 200 for performing variable privacy preservation, according to an embodiment of the present invention. That is, FIG. 2 illustrates an overall approach for performing condensation-based privacy preservation.

The process starts at block 202. As mentioned above, the condensation based approach is a two step process. In the first step, the process generates the condensed groups from the data (step 204). The summary statistics of these condensed groups are stored. These summary statistics may include the covariance matrix, as well as the sum of the attributes, and the number of records. Such statistics are explained in detail above. We note that this information is sufficient to determine the characteristics which are useful for privacy preservation. This step is further explained below in the context of FIG. 3.

Once the statistics of the condensed groups have been stored, they are used in the second step of the process to generate the pseudo-data for mining purposes (step 206). The pseudo-data are often available in the form of multi-dimensional records which are similar to the original data format. Such pseudo-data is the so-called "trusted data" that is sent to the non-trusted server (102-2 of FIG. 1) for use in data mining operations. The data is considered "trusted" since it obtains a degree of indistinguishability, thus preserving its privacy. The pseudo-data generation step is further explained below in the context of FIG. 6. The process ends at block 208.

Figure 3:
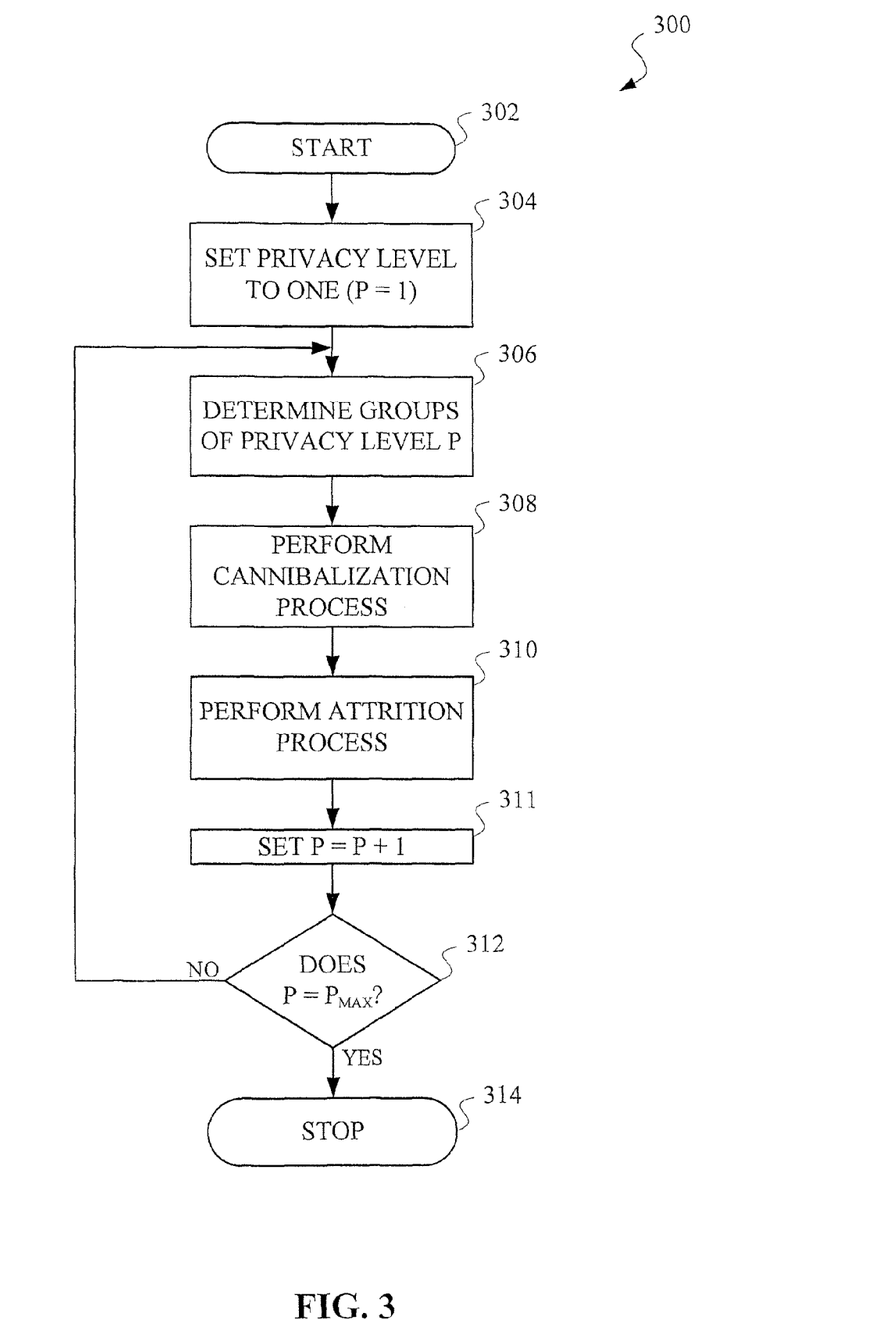
FIG. 3 illustrates a process for creating condensed groups for privacy preservation, according to an embodiment of the invention.

Referring now to FIG. 3, a flow diagram illustrates a process 300 for creating condensed groups for privacy preservation, according to an embodiment of the invention. FIG. 3 illustrates details of step 204 of FIG. 2. That is, FIG. 3 illustrates an overall process of performing condensation for the privacy preservation process.

The process starts at block 302. The condensation of the groups works with an iterative approach in which groups with successively higher privacy levels are generated. In FIG. 3, this privacy level is denoted by p. The process starts with the privacy level p=1 (step 304).

In step 306, the process determines groups of privacy level p. This can be done by using any conventional clustering algorithm, see, e.g., Jain and Dubes, "Algorithms for Clustering Data," Prentice Hall. The determination of such groups can be very useful for the privacy preservation process.

We note that often groups with lower privacy level can be distributed into groups with a higher privacy level using a cannibalization process. In order to perform cannibalization (step 308), the process examines all groups with privacy level (p-1) and redistributes the points (records) to groups with higher privacy levels, if such redistribution reduces the mean square errors of the data points. This step is further explained below in the context of FIG. 4.

We note that the process of cannibalization may often result in some groups having more points than their required privacy level. In such cases, the process can reassign the data points for the corresponding groups to lower privacy level groups. Thus, in step 310, the process performs the attrition which reassigns the points from groups with larger than p points to other groups. This reassignment is performed if such reassignment improves the errors of the corresponding data points. This step is further explained below in the context of FIG. 5.

In step 311, the privacy level p is incremented by one. Step 312 then checks whether p is equal to $p_{max}$. It is to be appreciated that $p_{max}$ is the maximum privacy requirement of any record in the data set. If p does not yet equal $p_{max}$, then the process returns to step 306 and continues. Once $p_{max}$ is reached, the process ends at block 314.

Figure 4:
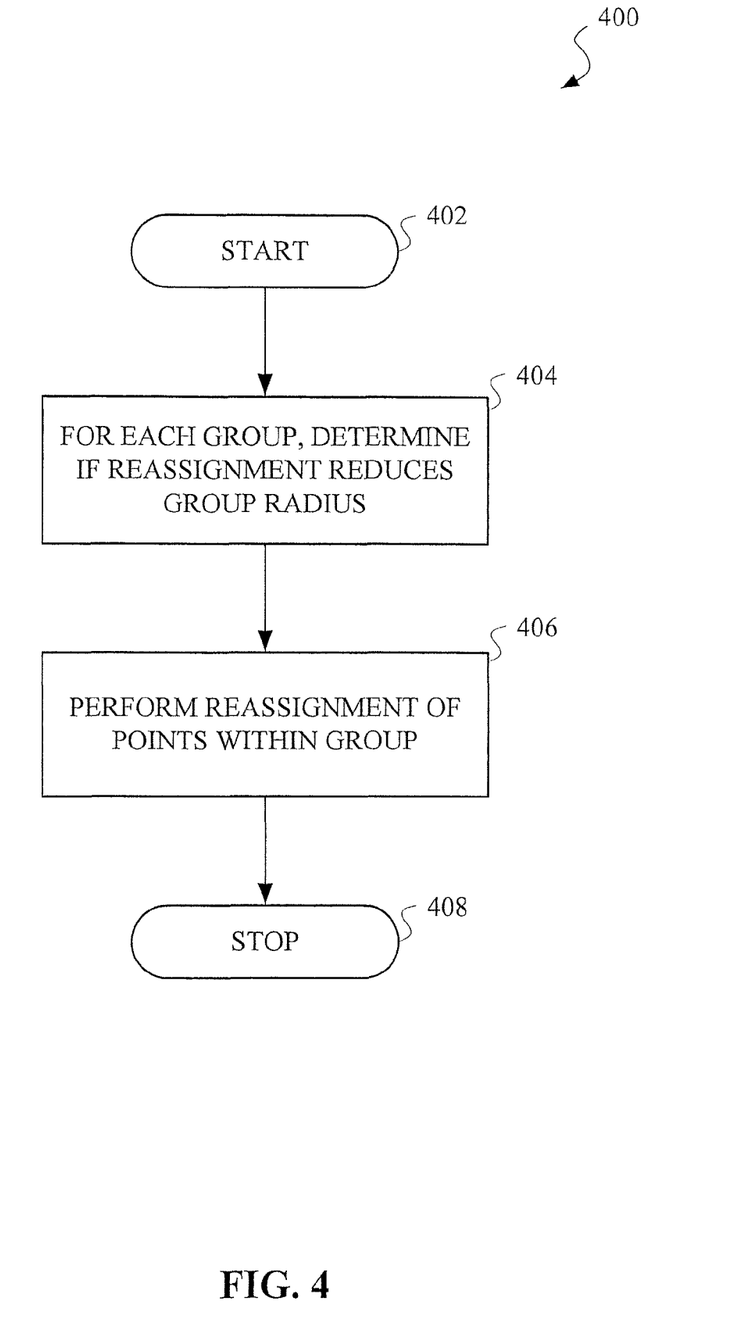
FIG. 4 illustrates a process for performing cannibalization for condensation, according to an embodiment of the invention.

Referring now to FIG. 4, a flow diagram illustrates a process 400 for performing cannibalization for condensation, according to an embodiment of the invention. In cannibalization (e.g., step 308 of FIG. 3), the process assigns the data points of a given group to those of a higher level group. This is done in order to improve the errors of the group formation process. The process starts at block 402.

The cannibalization process is performed as follows. For each group in which the privacy level is lower than the current value of p, the process determines if reassignment of all points in the group to their corresponding closest centroid improves the error values. This step is performed in step 404. If such a reassignment does indeed improve the group radius, then the reassignment is executed in step 406. Otherwise, that group is kept intact. The process ends at block 408.

We note that the process of cannibalization only reassigns a data point to groups with a higher privacy level. Consequently, the privacy level of each group is maintained. This is because all group sizes of the (remaining) groups are increased in the process. Thus, the privacy is increased by the cannibalization process while reducing the error.

Figure 5:
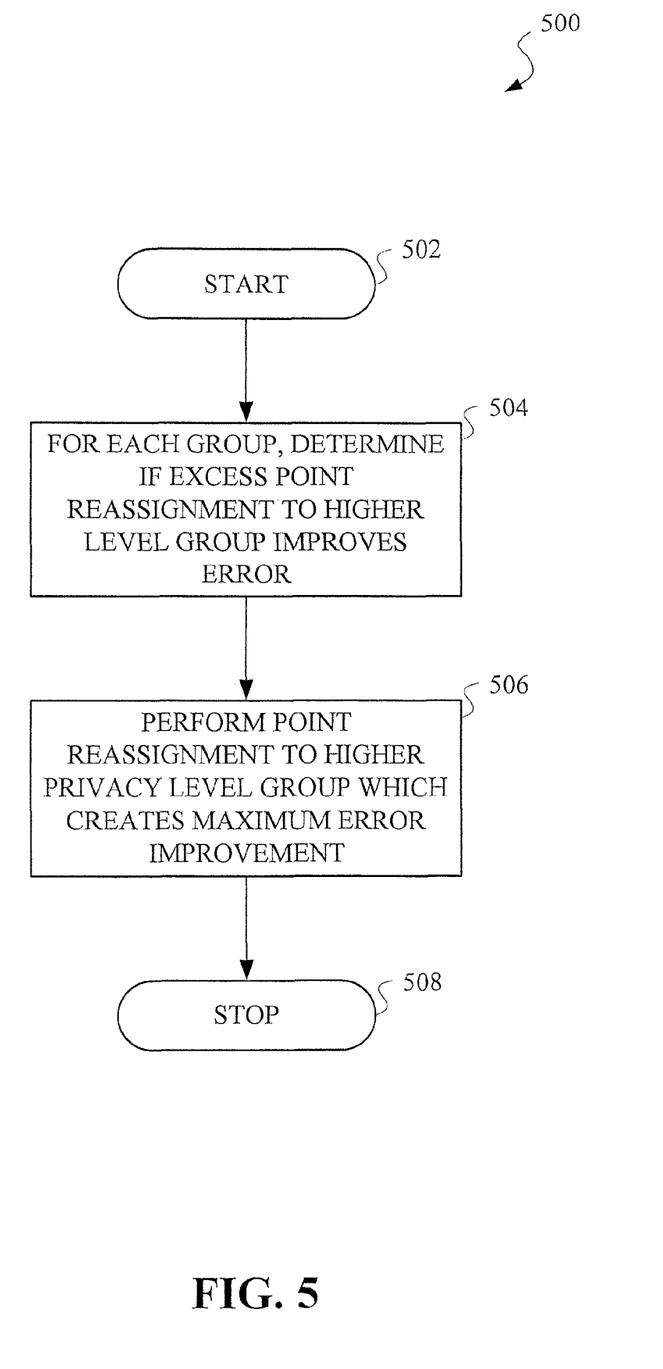
FIG. 5 illustrates a process for performing attrition for condensation, according to an embodiment of the invention.

Referring now to FIG. 5, a flow diagram illustrates a process 500 for performing attrition for condensation, according to an embodiment of the invention. We note that the use of attrition (e.g., step 310 of FIG. 3) can be helpful in reassigning the groups with excess data points in a more effective way. The process of attrition can be useful in reducing the overall errors of the privacy preservation process. The process starts at block 502. In step 504, the process determines if the moving of an excess point from a given group to its next closest centroid reduces the average error of the condensation. If this is the case, then the process performs the move from one centroid to the other (step 506). This process maintains privacy while increasing the compactness of the groups. The process ends at block 508.

Figure 6:
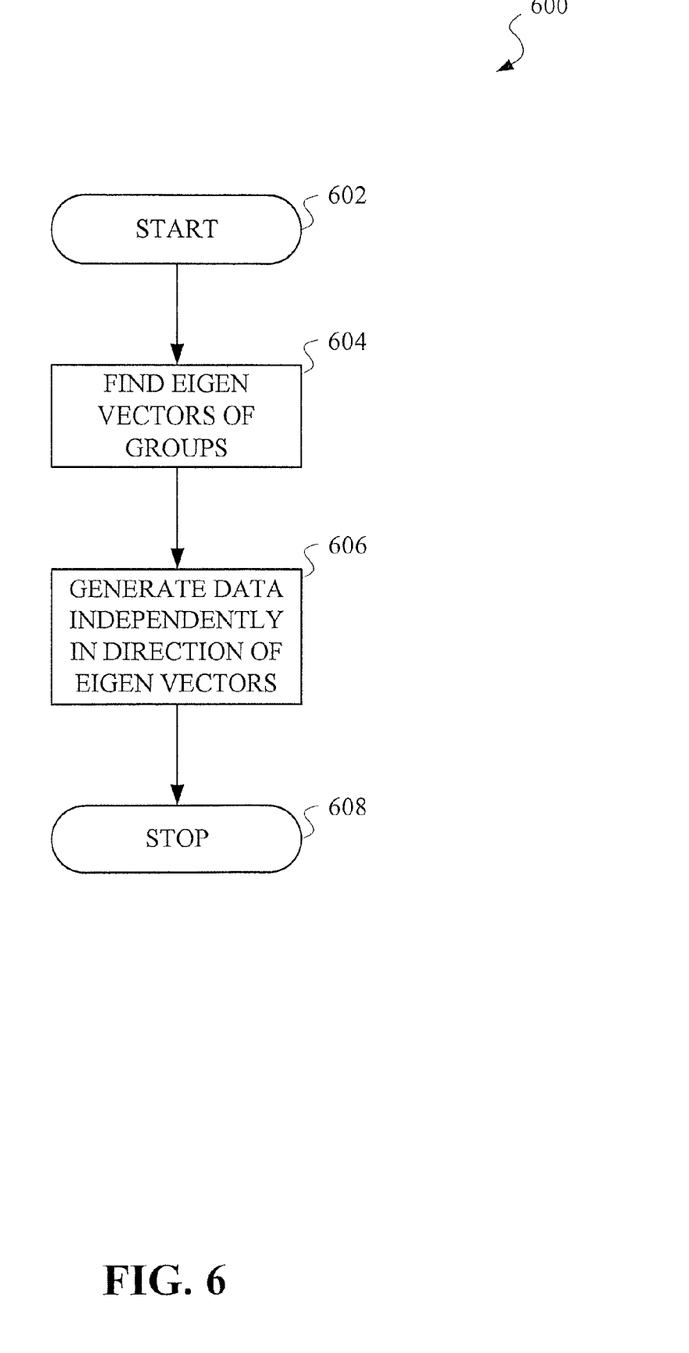
FIG. 6 illustrates a process for creating pseudo-data from condensed groups, according to an embodiment of the invention.

Referring lastly to FIG. 6, a flow diagram illustrates a process 600 for creating pseudo-data from condensed groups, according to an embodiment of the invention. FIG. 6 illustrates details of step 206 of FIG. 2. The process starts at block 602. The pseudo-data are generated by calculating the condensed statistics and generating the eigenvectors from each set of condensed statistics (step 604). The eigenvalues along these eigenvectors represent the corresponding variances. Then, the process generates the data independently along each eigenvector (step 606). More particularly, along each eigenvector, the process uses a uniform distribution with variance equal to the corresponding eigenvalue. The process ends at block 608.

As mentioned above, the above-described method of privacy preservation can also be extended to data streams. Specifically, in such case, the condensed statistics are updated incrementally as the data points are received. The incremental update of the condensed statistics is used in conjunction with a splitting step which is used when the group size exceeds twice the average privacy level. The process for splitting may include splitting the group along the longest eigenvalue. The process reconstructs aggregate statistics assuming that the distribution along each eigenvalue is uniform.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for preserving privacy of data records for use in a data mining application, comprising the steps of:
   assigning different privacy levels to the data records;
   constructing condensed groups of data records from the data records based on the privacy levels, wherein at least one condensed group of data records comprises a first data record having a first privacy level, which is condensed with a second data record having a second privacy level different than the first privacy level
   maintaining summary statistics for each condensed group of data records; and
   generating pseudo-data from the summary statistics, wherein the pseudo-data is available for use in the data mining application,
   wherein the assigning, constructing, maintaining and generating steps are performed by a data processing system.

2. The method of claim 1, wherein maintaining summary statistics further comprises:
   an iterative step of segmentation wherein data records with the same privacy level are included in one group;
   an iterative step of cannibalization wherein data records from one group are redistributed to other groups; and
   a step of attrition wherein data records from one group are reassigned to a closer group.

3. The method of claim 1, wherein data records of a given privacy level are processed in increasing order of privacy.

4. The method of claim 1, wherein data records of a given privacy level are processed in decreasing order of privacy.

5. The method of claim 2, wherein the cannibalization step redistributes records of a given privacy level to groups with higher privacy levels.

6. The method of claim 5, wherein the cannibalization step is performed when the reassignment of all data records within the group results in a lower squared error.

7. The method of claim 2, wherein the attrition step reassigns excess records from a given group to other groups.

8. The method of claim 1, wherein the data records are static.

9. The method of claim 1, wherein the data records are dynamic.

10. Apparatus for preserving privacy of data records for use in a data mining application, comprising:
    a memory; and
    a processor coupled to the memory and operative to:
    assign different privacy levels to the data records;
    construct condensed groups of data records from the data records based on the privacy levels, wherein at least one condensed group of data records comprises a first data record having a first privacy level, which is condensed with a second data record having a second privacy level different than the first privacy level;
    maintain summary statistics for each condensed group of data records; and
    generate pseudo-data from the summary statistics, wherein the pseudo-data is available for use in the data mining application.

11. The apparatus of claim 10, wherein maintaining summary statistics further comprises:
    an iterative operation of segmentation wherein data records with the same privacy level are included in one group;
    an iterative operation of cannibalization wherein data records from one group are redistributed to other groups; and
    an operation of attrition wherein data records from one group are reassigned to a closer group.

12. The apparatus of claim 10, wherein data records of a given privacy level are processed in increasing order of privacy.

13. The apparatus of claim 10, wherein data records of a given privacy level are processed in decreasing order of privacy.

14. The apparatus of claim 11, wherein the cannibalization operation redistributes records of a given privacy level to groups with higher privacy levels.

15. The apparatus of claim 14, wherein the cannibalization operation is performed when the reassignment of all data records within the group results in a lower squared error.

16. The apparatus of claim 11, wherein the attrition operation reassigns excess records from a given group to other groups.

17. The apparatus of claim 10, wherein the data records are static.

18. The apparatus of claim 10, wherein the data records are dynamic.

19. An article of manufacture for use in preserving privacy of data records for use in a data mining application, the article comprising a non-transitory machine readable medium containing one or more programs which when executed implement the steps of:
    assigning different privacy levels to the data records;
    constructing condensed groups of data records from the data records based on the privacy levels, wherein at least one condensed group of data records comprises a first data record having a first privacy level, which is condensed with a second data record having a second privacy level different than the first privacy level
    maintaining summary statistics for each condensed group of data records; and
    generating pseudo-data from the summary statistics, wherein the pseudo-data is available for use in the data mining application.

20. The article of claim 19, wherein maintaining summary statistics further comprises:
    an iterative step of segmentation wherein data records with the same privacy level are included in one group;
    an iterative step of cannibalization wherein data records from one group are redistributed to other groups; and
    a step of attrition wherein data records from one group are reassigned to a closer group.

* * * * *